United States Patent
Kobasa et al.

(10) Patent No.: US 7,662,476 B2
(45) Date of Patent: Feb. 16, 2010

(54) METAL SURFACE-MODIFIED SILICA-TITANIA COMPOSITES AND METHODS FOR FORMING THE SAME

(75) Inventors: Ihor Mykhaylovych Kobasa, Chernivtsi (UA); Wojciech Jan Strus, Krakow (PL); Mykhaylo Andriyovych Kovbasa, Ternopil (UA)

(73) Assignee: The Worthington Group of Tennessee, LLC, Sweetwater, TN (US)

( * ) Notice: Subject to any disclaimer, the term of this patent is extended or adjusted under 35 U.S.C. 154(b) by 46 days.

(21) Appl. No.: 12/139,067

(22) Filed: Jun. 13, 2008

(65) Prior Publication Data

US 2009/0311532 A1  Dec. 17, 2009

(51) Int. Cl.
  *B32B 5/16* (2006.01)
  *B05D 5/00* (2006.01)

(52) U.S. Cl. ............... 428/403; 427/215; 427/217; 428/697; 428/699; 428/701; 428/702; 977/811; 977/890

(58) Field of Classification Search ............... 428/403, 428/697, 699, 701, 702; 427/212, 215, 217; 977/811, 890
See application file for complete search history.

(56) References Cited

U.S. PATENT DOCUMENTS

| | | | | |
|---|---|---|---|---|
| 4,347,229 | A * | 8/1982 | Schmid et al. | 423/336 |
| 5,169,821 | A * | 12/1992 | Soled et al. | 502/242 |
| 6,734,133 | B1 * | 5/2004 | Weisbeck et al. | 502/119 |
| 6,796,143 | B2 * | 9/2004 | Clasen et al. | 65/17.3 |
| 7,083,769 | B2 * | 8/2006 | Moerters et al. | 423/326 |
| 7,416,600 | B2 * | 8/2008 | Schumacher et al. | 106/446 |
| 2003/0129153 | A1 * | 7/2003 | Moerters et al. | 424/59 |
| 2005/0183634 | A1 * | 8/2005 | Schumacher et al. | 106/446 |
| 2007/0186816 | A1 * | 8/2007 | Schumacher et al. | 106/446 |

FOREIGN PATENT DOCUMENTS

JP   2003001117 A   1/2003

* cited by examiner

*Primary Examiner*—H. (Holly) T Le
(74) *Attorney, Agent, or Firm*—Jetter & Associates, P.A.

(57) ABSTRACT

A method for in-situ formation of surface modified mixed oxide material includes burning a titanium chloride comprising compound and a silicon chloride comprising compound in the presence of oxygen and hydrogen in a reactor to form a plurality of silica-titania mixed oxide particles, wherein a temperature during the burning step is from 700 to 1100° C. In embodiments of the invention a concentration of hydrogen is in a stoichiometric excess ($H_2:O_2$) to oxygen from 2.02:1 to 2.61:1 during the burning step. While the mixed oxide particles are still in the reactor, a metal is deposited on a surface of the mixed oxide particles at a temperature below the temperature of the burning step, such as in the form of randomly located nanoparticle clusters which only partially cover the surface of the mixed oxide particles. The titania can be non-stoichiometric $TiO_{2-x}$, wherein $0.1 < x < 0.3$ at a surface of the particles and in the bulk of the particles x is less than at the surface.

20 Claims, 3 Drawing Sheets

METAL SURFACE-MODIFIED SILICA-TITANIA COMPOSITES AND METHODS FOR FORMING THE SAME

FIELD OF THE INVENTION

The present invention relates to silica-titania comprising composite materials.

BACKGROUND

Composite materials formed from a base material together with one or more filler materials are known to be capable of improving properties of the base material. For example, $SiO_2$ (silica) filling is known for improving the thermal conductivity of resin-based semiconductor packaging. Theoretical thermal conductivity coefficients of silica are generally larger than the conventional resin based materials, so a high-density packing of silica filler is one promising approach to obtain such composite materials. As known in the art, the morphology of the filler particles can change the properties of the resulting polymer composite.

Certain materials that can be used as fillers can also provide chemical activity. For example, $TiO_2$ (titania) is known to provide photocatalytic activity. Photocatalytic activity can be enhanced by certain surface processing, such as addition of certain metals on the titania surface. There are some solution-based methods for production of finely dispersed titania having metal on the surface of the particles. However, solution-based methods are generally lengthy multi-step process flows, which form a large amount of wastewater, and may lack sufficient photocatalytic activity and/or stability of photocatalytic activity of the modified titania for certain applications.

What is needed is a new silica comprising filler material that provides significant photocatalytic activity, good catalytic stability, and a simpler process flow for forming the same.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A method for in-situ formation of surface modified mixed oxide material comprises burning a titanium chloride comprising compound and a silicon chloride comprising compound in the presence of oxygen and hydrogen in a reactor to form a plurality of silica-titania mixed oxide particles, wherein a temperature during the burning step is from 700 to 1100° C. The ratio of hydrogen concentration to oxygen concentration during the burning step can be in the range from 1.91:1 to 2.61:1 ($H_2$:$O_2$). In one embodiment of the invention, the hydrogen concentration is in a stoichiometric excess to the oxygen concentration ($H_2$:$O_2$), such as from 2.02:1 to 2.61:1. In one particular embodiment of the invention, during the burning step the hydrogen concentration to oxygen concentration is in a ratio of 2.55:1 to 2.60:1, such as 2.56: to 2.58.

While the mixed oxide particles are in the reactor, a metal is deposited on a surface of the mixed oxide particles at a temperature below the temperature of the burning step. The metal on the mixed oxide particle surface is generally in the form of randomly located nanoparticle clusters which only partially cover the surface of the mixed oxide particles. In embodiments of the invention, the titania comprises non-stoichiometric $TiO_{2-x}$, wherein $0.1<x<0.3$ at a surface of the particles and in the bulk of the particles x is less than at the surface. In another embodiment, a source for the metal is supplied to the reactor during the burning step, wherein as a result, the bulk of the mixed oxide particles also includes the metal, such as in the form of metal nanoparticles. The method can further comprising removing adsorbed chlorine from the surface with steam at a steaming temperature $\leqq 220°$ C., such as between 170 and 200° C.

BRIEF DESCRIPTION OF THE DRAWINGS

A fuller understanding of the present invention and the features and benefits thereof will be obtained upon review of the following detailed description together with the accompanying drawing, in which.

DETAILED DESCRIPTION

Figure 1:
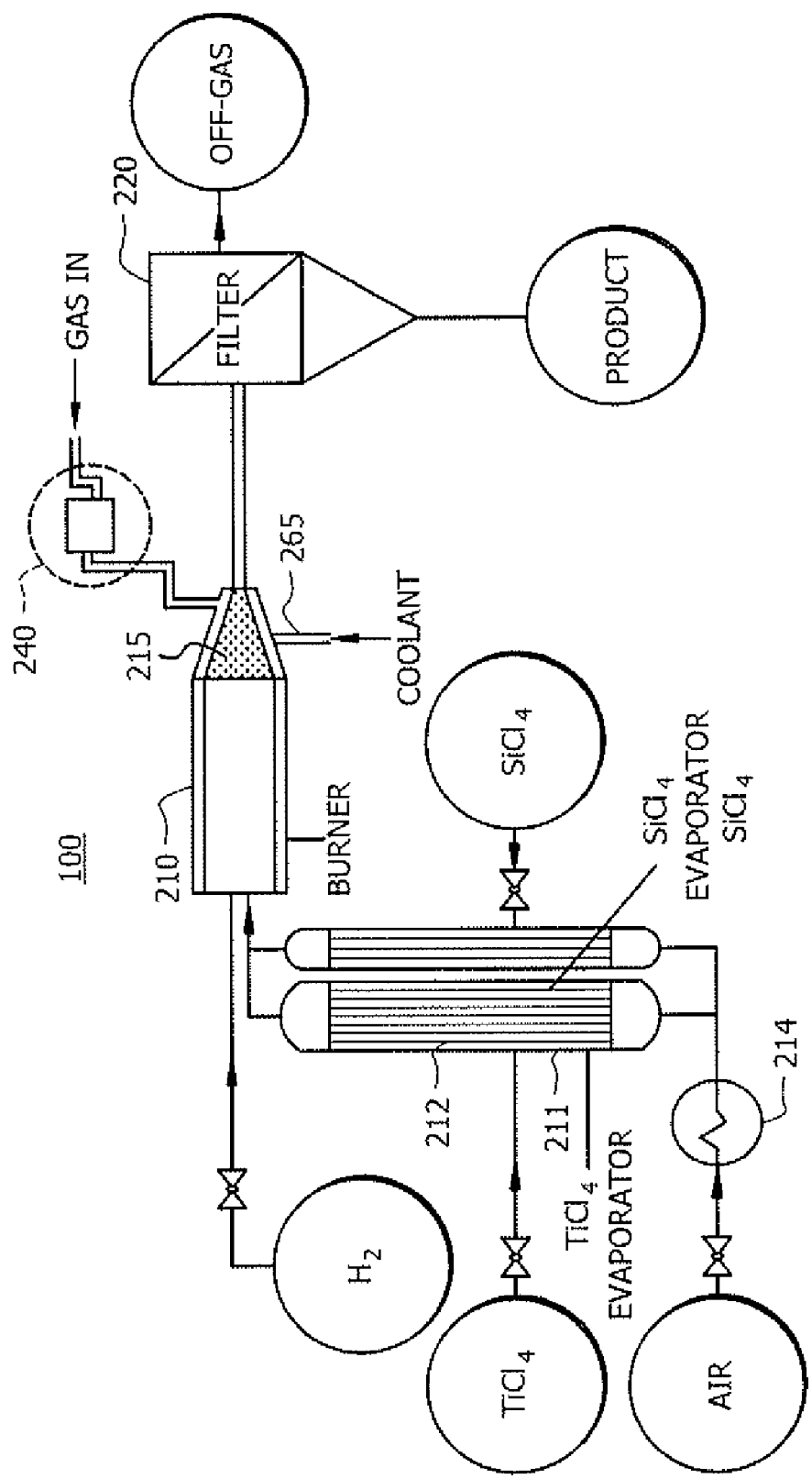
FIG. 1 shows a simplified exemplary reactor apparatus that can be used to produce surface modified silica-titania (mixed oxide) particles, according to an embodiment of the invention.

The present invention is described with reference to the attached FIGs., wherein like reference numerals are used throughout the FIGs. to designate similar or equivalent elements. The FIGs. are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

A method for in-situ formation of surface modified silica-titania particles (hereafter generally referred to as "surface modified mixed oxide particles") comprises the steps of burning a silicon chloride and a titanium chloride comprising compound in the presence of oxygen and hydrogen in a reactor to form plurality of silica-titania mixed-oxide comprising particles. A temperature during the burning step is generally from 700 to 1100° C. After formation of the mixed oxide particles, metal is deposited on the surface of the mixed-oxide particles while in the same reactor at a temperature below the temperature for the burning step, such as 300 to 700° C. to form the surface modified mixed oxide particles. As used herein, a "reactor" comprises a burner or equivalent structure for mixing the silicon chloride and a titanium chloride comprising compound in the presence of oxygen and hydrogen having an orifice coupled to a flame tube or equivalent structure where hydrolysis occurs, and an optional heat exchanger coupled to the outlet end of the flame tube. The metal on the mixed oxide particle surface is generally in the form of randomly located nanoparticle clusters which only partially cover the surface of the mixed oxide particles.

The silica-titania mixed oxide particles can include oxides other than silica and titania. For example, by burning aluminum chloride ($AlCl_3$) along with a silicon chloride and a titanium chloride compound, a three oxide (ternary) composition $TiO_2$—$SiO_2$—$Al_2O_3$ can be formed.

In one embodiment, the depositing step comprises cooling the mixed oxide particles while in the reactor to a temperature between 300 and 700° C. in an atmosphere comprising at least one metal source and a reducing agent (e.g. excess hydrogen). The depositing can comprise injecting an aerosol comprising the metal to be deposited into a heat exchanger, such as a pipe-in-pipe heat exchanger, or in a cooling area of the reactor (e.g. a cooled flame tube).

In another embodiment of the invention, the metal is deposited in the course of mixed oxide particle formation, rather than after formation of the mixed oxide particles as described above. In one embodiment, the metal source can also be added to the gas mixture which is supplied to the burner. Alternatively, the metal source can be injected directly into the flame tube. Regarding the resulting mixed oxide particles according to this embodiment, metal nanoparticles are formed in the bulk of particles as well as on the particle surface. Moreover, depending on a nature of the modifying metal, its size, concentration, and synthesis conditions, the type of resulting solid solution can be changed (e.g. between lattice substitution or interstitial).

The method can further include the step of removing adsorbed chlorine from the surface of the mixed oxide particles with steam in a steaming process at a temperature below the temperature for the depositing step. Steaming can help eliminate or at least substantially reduce the amount of "acid" gases (e.g. ~0.1-0.15 mass % of HCl, $Cl_2$), which can get adsorbed on the surface of the mixed oxide particles. Modified mixed oxide particles can be steamed in air, which can be preliminary moistened by distilled water vapor at a temperature around 400° C. Steam processing of the surface of the modified mixed oxide powder can be an in situ process, such as using the exemplary apparatus 300 shown in FIG. 3 described below, or performed in a separate step. The temperature range for steaming the mixed oxide powder is generally from 150° C. to 220° C.

The ratio of hydrogen concentration to oxygen concentration during the burning step is generally in the range from 1.91:1 to 2.61:1 ($H_2:O_2$). In embodiments of the invention the concentration of hydrogen is generally in a stoichiometric excess to that of oxygen ($H_2:O_2$), such as from 2.02:1 to 2.61:1, during the burning step. In various embodiments of the invention the $H_2:O_2$ ratio can be in the range 2.02:1 to 2.01:1, 2.10:1 to 2.20:1, 2.20:1 to 2.30:1, 2.30:1 to 2.40:1, 2.40:1 to 2.50:1, 2.50:1 to 2.60:1, or 2.60:1 to 2.61:1.

The ratio of the titanium chloride comprising compound, such as $TiCl_4$, to $H_2$ is generally from 1:5.5 to 1:11.06. This ratio range has been found to provide titania having superior photoactivity. The ratio of the silicon chloride comprising compound, such as $SiCl_4$, to $H_2$ is generally from 1:3.57 to 1:11.51.

The metal can comprise various metals, such as Pd, Pt, Zn, W, Bi and Mo, which can be provided in a salt or certain metals in a molecular form. Other metals can also be used, which can include, but are not limited to, V, Al, Zr, Hf, Si, Cu, Co, Ni, Fe, La, Ce, Pr, Nd, Sm, Eu, Gd, Dy, Ho, Er and Tm.

In one particular embodiment, $TiCl_4$ and $SiCl_4$ vapors are burned in an air-hydrogen flame at 900° C. to form finely-dispersed mixed oxide powder. The mixed oxide powder is then treated in a cooling area of the reactor at a temperature of about 400-600° C. with vapors derived from an aqueous solution of palladium chloride injected into the reactor to form a modified mixed oxide powder. The modified powder can then be steamed at 150 to 220° C., such as 170-200° C., before being collected and aggregated at a suitable filter/aggregator.

Regarding the catalytic activity of the final modified mixed oxide product, as used herein, catalytic activity refers to amount of $Cu^{2+}$ ions consumed in reaction of chemical coppering during 1 minute at room temperature. The reaction of the coppering involves reduction of $Cu^{2+}$ ions with formaldehyde in an alkaline media with tartaric acid anions. Catalytic activity can be calculated using formula $CA=(1-C_2/C_1)\cdot 100$, where CA is the catalytic activity (%), $C_1$ and $C_2$ being the concentration of $Cu^{2+}$ ions before and after contact with the catalyst respectively. Catalytic activity of the modified mixed oxide product according to the invention is generally in the range of 28-80%. Catalytic activity under 50% is generally considered catalytically inactive and as such is generally not useful as a catalyst, such as for redox processes.

FIG. 1 shows a simplified reactor apparatus 100 that can be used to produce surface modified mixed oxide particles, according to an embodiment of the invention. Source materials include an oxygen comprising gas such as air, hydrogen, a titanium chloride compound, such as titanium tetrachloride ($TiCl_4$), and a silicon chloride compound, such as silicon tetrachloride ($SiCl_4$). Apparatus 100 is shown including $TiCl_4$ evaporator 211 and $SiCl_4$ evaporator 212. The $TiCl_4$ and $SiCl_4$ source materials can be heated to 70-110° C. in their respective evaporators and piped to the burner/combustion chamber 210, where they mix with each other, and are combined with oxygen and a stoichiometric excess of $H_2$. Heating up to at least 70-100° C. helps avoid condensation of $TiCl_4$ and $SiCl_4$ vapor during piping. The heating also generally promotes keeping the reacting mixture more stable and uniform.

The temperature of the reacting mixture can be higher than boiling point of the titanium chloride and silicon chloride compound, such as for example 140° C., (at standard temperature and pressure (STP), the boiling point for $TiCl_4$ is ~138° C.; and the boiling point for $SiCl_4$ is ~58° C.). As shown in FIG. 1, the $TiCl_4$ and $SiCl_4$ are mixed in their respective evaporators with air heated by heater 214, which helps prevent condensation of $TiCl_4$ and $SiCl_4$ vapor. The pipes between evaporators 211 and 212 and burner 210 can also be heated to avoid the vapor condensation inside. If condensation occurs, new liquid-drop phase appears in the gas mixture, which can significantly change the burning process regime. Condensation before burner 210 generally leads to obtaining coarse- and poly-disperse titania powder.

The distal end of burner 210 includes an orifice for injecting the essentially homogenized reaction components into flame tube 215. Burner 210 generally performs only mixing/homogenization of all needful components, which generally only start to burn at the orifice of burner 210. The reagents are piped in a generally laminar mode from the orifice of burner 210 to flame tube 215 where the air-hydrogen mixture burns at 700-1100° C. causing hydrolysis of both titanium tetrachloride and silicon tetrachloride:

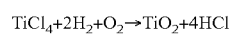

$TiCl_4+2H_2+O_2 \rightarrow TiO_2+4HCl$

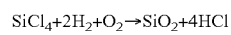

$SiCl_4+2H_2+O_2 \rightarrow SiO_2+4HCl$

Primary mixed oxide particles of silicon-titanium dioxide are formed in this reaction. Primary particles are generally 2 to 8 nm in size.

Another side-process may also co-run:

$$4HCl + O_2 \rightarrow 2H_2O + 2Cl_2$$

Burner 215 includes a cooling structure that is cooled by coolant 265 flowing there through. The flame generally extends from the orifice of burner 210 towards the adjacent end of flame tube 215. As a result of cooling from coolant 265, the flame does not extend along the full length of the flame tube 215. Instead, there is a cooling area of the flame tube 215 where the hydrolysis product is cooled and where the hydrolysis product starts to form particles. The temperature inside cooling area of flame tube 215 is generally about 300-700° C. Bubbler 240 and associated coupling to flame tube 215 is used to deliver metal comprising vapors from an aerosol generated by bubbler 240 to the cooling area of the flame tube. The carrier gas used for bubbler can be a variety of gasses, such as air or an inert gas. Metal from the metal comprising vapor interacts with surface of mixed oxide particles in the cooling area of flame tube 215. The metal coated particles then reach filter/coagulator 220, where the particles can agglomerate to form larger agglomerated particles.

Secondary particles of mixed oxide according to the invention are generally finally formed as agglomerates in the coagulator 220. The agglomerated size is generally 10 to 50 nm. A plurality of spaced apart nanosized metal clusters (e.g. Pd), generally in the size range from 2 to 10 nm, form on the surface of the mixed oxide particles. The final product can also be steamed, such as in situ in a temperature range of 170-200° C., to remove surface adsorbed HCl and Cl$_2$. The steaming environment can be, for example, an air-water or an inert gas-water mixture.

Figure 2:
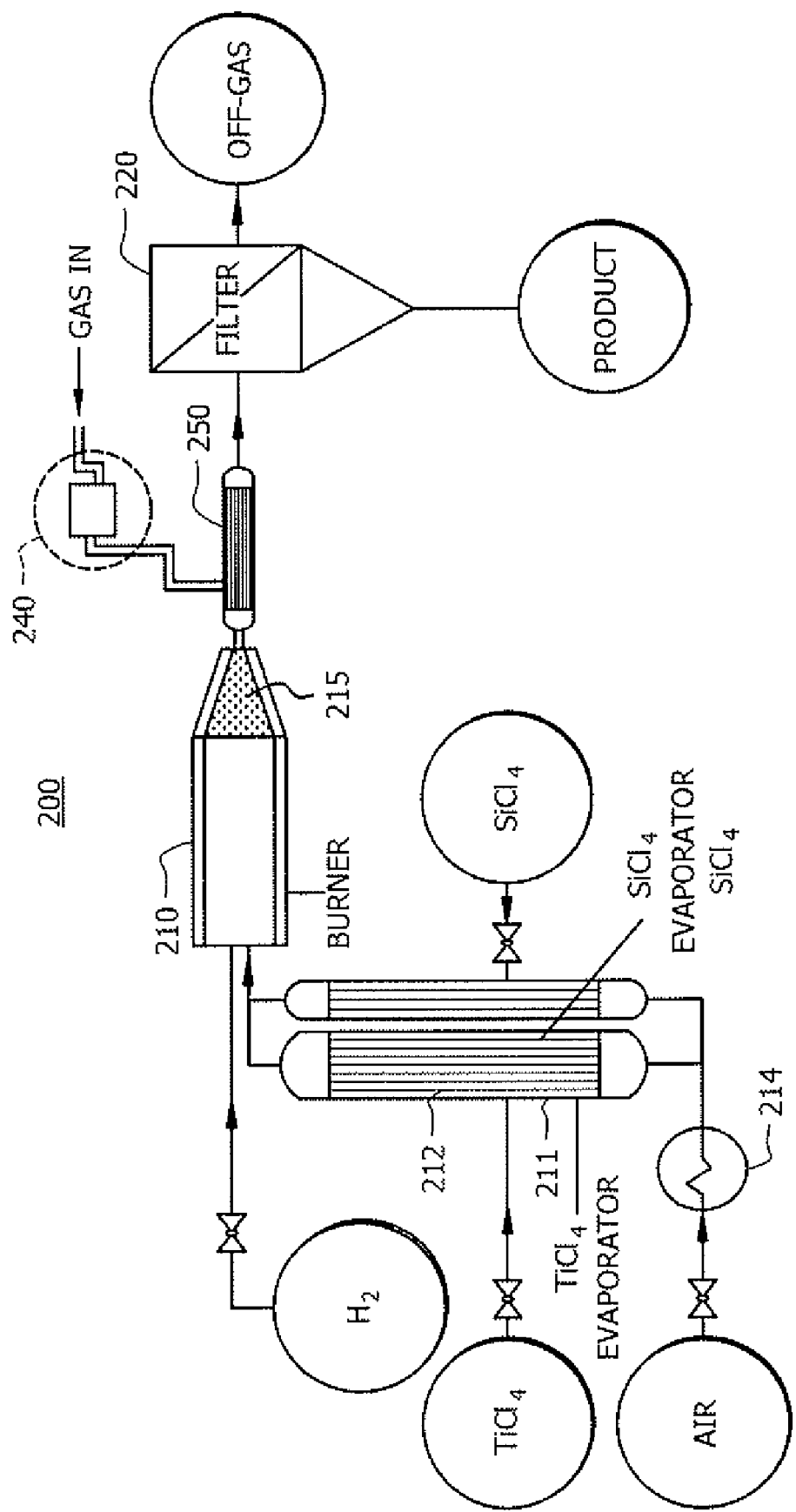
FIG. 2 shows a simplified exemplary reactor apparatus that can be used to produce surface modified silica-titania (mixed oxide) particles, according to another embodiment of the invention.

FIG. 2 shows a simplified exemplary reactor apparatus 200 that can be used to produce surface modified silica-titania (mixed oxide) particles, according to another embodiment of the invention. In apparatus 200 flame tube 215 is uncooled, while a heat exchanger 250 is provided to provide a cooling region of the reactor at about 300-700° C. The heat exchanger 250 can comprise a tube-in-tube heat exchanger. Although the invention is generally described using a tube-in-tube heat exchanger 250, a variety of other heat exchangers or other means for cooling can be used.

Bubbler 240 and associated coupling connectors to heat exchanger 250 are used to deliver metal comprising vapors from an aerosol generated by bubbler 240 to the cooling area provided by heat exchanger 250. As with apparatus 100, the metal coated particles in apparatus 200 after formation reach filter/coagulator 220, where the particles can agglomerate to form larger agglomerated particles.

Figure 3:
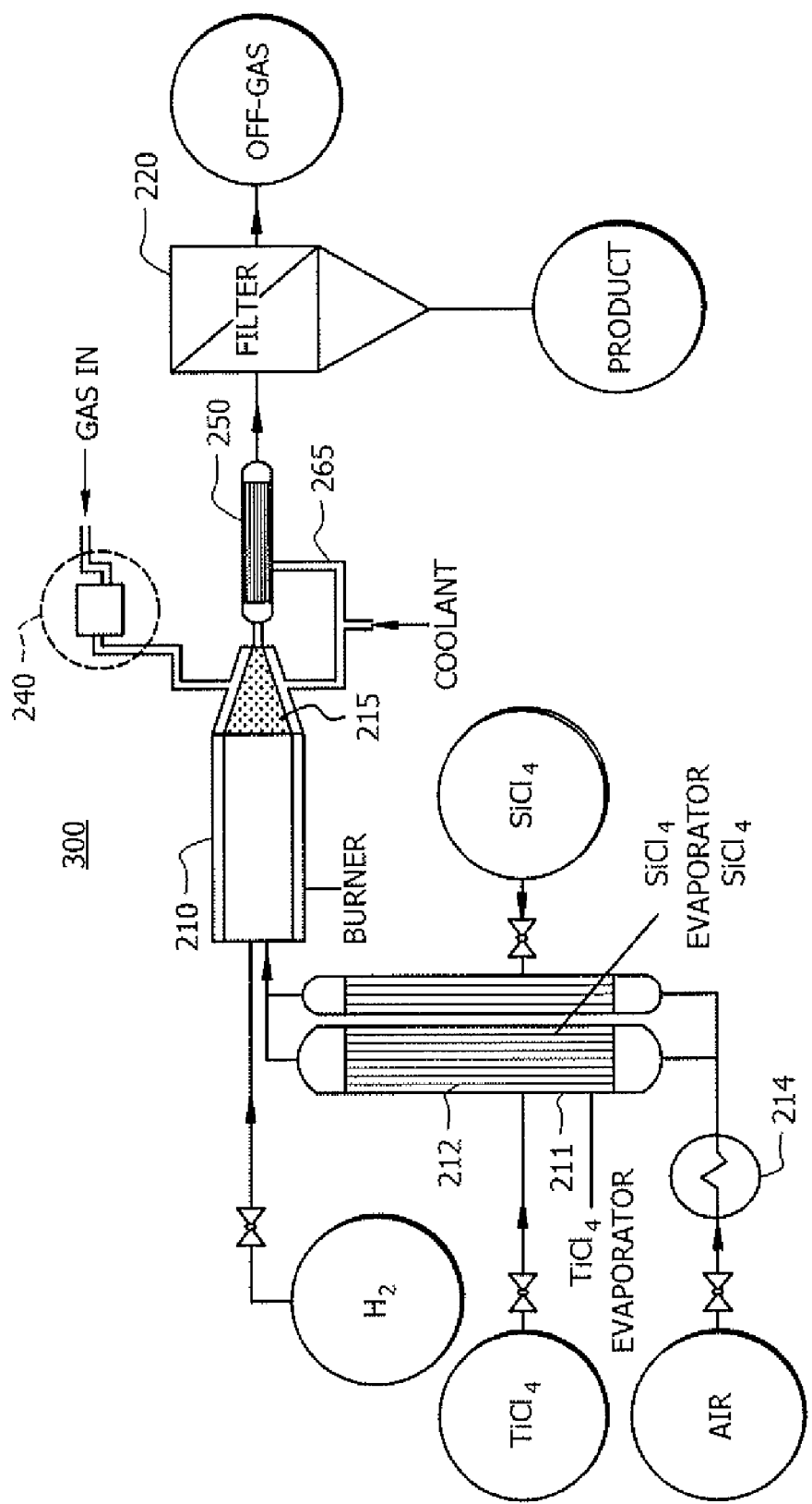
FIG. 3 shows a simplified exemplary reactor apparatus that can be used to produce surface modified silica-titania (mixed oxide) particles, according to yet another embodiment of the invention.

FIG. 3 shows a simplified exemplary reactor apparatus 300 that can be used to produce surface modified silica-titania (mixed oxide) particles, according to yet another embodiment of the invention. Apparatus 300 comprises a flame tube 215 that is cooled to provide the cooling region at about 300-700° C. for the reactor. As with apparatus 100 shown in FIG. 1, the temperature inside cooling area of flame tube 215 is generally about 300-700° C. Bubbler 240 and associated coupling to flame tube 215 is used to deliver metal comprising vapors from an aerosol generated by bubbler 240 to the cooling area of the flame tube to form metal coated particles. A heat exchanger 250 is coupled to the outlet of flame tube 215. The heat exchanger 250 can comprise a tube-in-tube heat exchanger. In apparatus 300 the heat exchanger 250 can be used to in-situ steam the surface modified mixed oxide powder at a temperature of about 170-200° C. before reaching coagulator/filter 220.

Using a steaming process at about 170 to 200° C., the resulting mixed oxide particles generally have a pH of ~3-4.

However, if more neutral pH particles are desired, steaming can occur at a temperature above 200° C., such as 201° C. to 450° C. In this embodiment, a heater (not shown) can be coupled to the heat exchanger to provide a steaming temperature >200° C.

Fine metal surface modified mixed oxide particles according to the invention is the final product generally produced. The particles generally comprise 20 to 65 wt. % TiO$_2$ and 35 to 80 wt. % SiO$_2$. The TiO$_2$:SiO$_2$ ratio can generally be changed by changing the relative flows of the silicon chloride and a titanium chloride comprising compounds. In embodiments of the invention, the modified product comprises non-stoichiometric titania. As used herein, "non-stoichiometric TiO$_2$" comprises TiO$_{2-x}$, wherein $0.1 < x < 0.3$ at a surface of the particles, and in the bulk of the particles x is less than at the surface, such as at least 10% less. The titania is generally obtained as a mixture of two various crystalline modifications, anatase and rutile. This causes high defectiveness of the material, which ensures high paramagnetic susceptibility, photosensitivity and dark-phased catalytic activity of the mixed oxide material.

Although not necessary to practice the present invention, Applicant, not seeking to be bound by any mechanism, provides the following mechanism believed to be operable. Ions of a metal derived from a metal salt, such as Pd$^{2+}$ in the case of PdCl$_2$, deposit on surface of the mixed oxide particles as a result of exposure to the metal salt. The ions then undergo reduction in the air-hydrogen medium and transform into active metal catalytic centers.

Metal surface modified mixed oxide particles according to the invention can be used as filler for a wide variety of materials. In a typical embodiment, 2-20 weight % of surface modified mixed oxide particles according to the invention is added to another material to make it photoactive. One example is use in the production of the polymer-based composite materials, paper, and films. For example, modified mixed oxide particles can be added to composite materials, such a composite comprising a resin epoxy reinforced with a woven fiberglass mat (e.g. FR-4). For example, some amount of the mixed oxide particles can be added to the source mixture to produce a composite material. The resulting polymer-based composite material becomes catalytically active and can be metallized after such modification. In one embodiment, the metallization process comprises preliminarily preparing a dielectric surface (e.g. roughened either mechanically or chemically), and activation (e.g. through applying a copper sulfate and formaldehyde comprising solution), and then exposed to UV light. This process results in generation of the hidden catalytic centers followed by metallization of the hidden centers using the copper sulfate and formaldehyde comprising solution.

Mixed oxide particles according to the invention can also generally be used to initiate chemical metallization processes. For example, palladium ions can be reduced on the modified surface of the TiO$_2$—SiO$_2$ particles during the first stage of a chemical metallization process. A Cu$^{2+}$ comprising solution and formaldehyde can be used in this process. Metallization processes involving modified silica-titania material run much faster than in case of non-modified material. This is generally caused by two alternating process one of which includes transferring of electrons onto nanoparticles of the modifying metal and another one includes chemo sorption of Cu$^{2+}$ ions onto negatively charged catalytic centers formed in the previous process. Cu$^{2+}$ ions discharge on such centers forming new copper atoms, which are being included into a nanoparticle lattice. The rate of this process is higher than for a regular non-catalyzed reduction of Cu$^{2+}$ ions.

EXAMPLES

It should be understood that the Examples described below are provided for illustrative purposes only and do not in any way define the scope of the invention.

A reactor system similar to system 300 shown in FIG. 3 was used for all Examples described herein to form silica-titania mixed oxide particles having a surface modified with Pd. The surface Pd content was generally found to be 0.01 to 0.075 mass %. The photocatalytic activity of the Pd surface modified samples was found to be 1.0-4.0 mg/(ml·min·m$^2$), catalytic activity was found 28-80%, magnetic susceptibility=$0.5 \times 10^{-6}$ to $2.8 \times 10^{-6}$ cm$^3$/g; and average particle size of 10-50 nm. The particle shape was found to be generally spherical, density of 110-160 g/l; the anatase-to-rutile ratio of the titania 20:80 to 80:20; and the surface chlorine content 0.1-0.15 mass %.

Example 1

A burner was fed with a mixture of 100 l/hr of dried and heated to 100° C. air, 40 l/hr of liquid TiCl$_4$ and 20 l/hr of liquid SiCl$_4$ which were both evaporated, and 45 l/hr of hydrogen. The TiCl$_4$ and SiCl$_4$ liquid flows are convertible to gas flows as follows. TiCl$_4$ has a molecular weight of 190; and a density of 1.726 g/mL, while SiCl$_4$ has a molecular weight of 170; and a density of 1.483 g/mL. For TiCl$_4$: 40 l*1.726=69.04 kg (weight); 69.04/190=0.363 kmoles or 363 moles. Accordingly, the amount of TiCl$_4$ is 363*22.4=8139.5 liters (gas phase). For SiCl$_4$: 20 l*1.483=29.66 kg (weight) 29.66/170=0.175 kmoles or 175 moles. Accordingly, the amount of SiCl$_4$ is 175*22.4=3920 liters (gas phase). Accordingly, the ratio of TiCl$_4$:H$_2$=8139.5:45000=1:5.53 and the ratio of SiCl$_4$:H$_2$=3920:45000=1:11.47. This mixture was burned at 900° C., then an aqueous solution of PdCl$_2$ (0.24 g/l) was injected (40 l/hour) through an additional sprayer into the cooling area of the reactor at about 400° C. The Pd surface modified mixed oxide product was steamed at 170° C. The final product comprised about 40% wt. of TiO$_2$ and about 60% wt. % SiO$_2$ and was found to have a specific surface area of 80 m$^2$/g. Catalytic activity was found to be 62%.

Example 2

A mixture of TiO$_2$ and SiO$_2$ was synthesized as described in Example 1. The same palladium chloride solution was injected at about 500° C. and steaming took place at about 190° C. The final product comprised about 40 wt. % TiO$_2$ and about 60 wt. % of SiO$_2$ and was found to have a specific surface area of 82 m$^2$/g. Catalytic activity was found to be 74%.

Example 3

A mixture of TiO$_2$ and SiO$_2$ was synthesized as in Example 1. The same palladium chloride solution was injected at about 600° C. and steaming took place at about 200° C. The final product comprised about 40 wt. % of TiO$_2$ and about 60 wt. % SiO$_2$ and was found to have a specific surface area of 80 m$^2$/g. Catalytic activity was found to be 67%.

Example 4

A mixture of TiO$_2$ and SiO$_2$ was synthesized as in Example 1. The same palladium chloride solution was injected at about 350° C. and steaming took place at about 170° C. The final product comprised about 40 wt. % TiO$_2$ and about 60 wt. % SiO$_2$ and was found to have a specific surface area of 75 m$^2$/g. Catalytic activity was found to be 28%.

Example 5

A mixture of TiO$_2$ and SiO$_2$ was synthesized as in Example 1. The same palladium chloride solution was injected at about 650° C. and steaming took place at about 200° C. The final product comprised about 40 wt. % TiO$_2$ and about 60 wt. % SiO$_2$ and was found to have a specific surface area of 70 m$^2$/g. Catalytic activity was found to be 31%.

Example 6

A burner was fed with a mixture of reactant compositions 1 and 2. Reactant composition 1 comprised 100 l/hr of the dried and heated to 100° C. air and 45 l/hr of hydrogen. Reactant composition 2 comprised SiCl$_4$ vapor heated to 100° C. (from 64.5 l/hour SiCl$_4$ liquid), TiCl$_4$ vapor heated to 100° C. (from 20 l/hr TiCl$_4$ liquid) and 30 l/hr of dried and heated air. A mixture of these reactant compositions were burned and treated as in described in Example 2. The final product comprised about 30 wt. % TiO$_2$ and about 70 wt. % SiO$_2$ and was found to have a specific surface area of 90 m$^2$/g. Catalytic activity was found to be 62%.

Example 7

A burner was fed with a mixture of reactant compositions 1 and 2. Reactant composition 1 comprised 100 l/hr of the dried and heated to 100° C. air and 45 l/hr of hydrogen. Reactant composition 2 comprised SiCl$_4$ vapor heated to 100° C. (from 40 l/hr SiCl$_4$ liquid), TiCl$_4$ vapor heated to 100° C. (from 20 l/hr TiCl$_4$ liquid) and 30 l/hour of dried and heated air. A mixture of the reactant compositions were burned and treated as in Example 2. The final product comprised about 40 wt. % of TiO$_2$ and about 60 wt. % of SiO$_2$ and was found to have a specific surface area of 47 m$^2$/g. The catalytic activity was found to be 80%.

Example 8

A burner was fed with a mixture of reactant compositions 1 and 2. Reactant composition 1 comprised 100 l/hr of the dried and heated to 100° C. air and 45 l/hr of hydrogen. Reactant composition 2 comprised SiCl$_4$ vapor heated to 100° C. (from 28 l/hr SiCl$_4$ liquid), TiCl$_4$ vapor heated to 100° C. (from 20 l/hr TiCl$_4$ liquid) and 30 l/hr of dried and heated air. A mixture of the reactant compositions was burned and treated as described in Example 2. The final product comprised about 50 wt. % of TiO$_2$ and about 50 wt. % % of SiO$_2$ and was found to have a specific surface area of 61 m$^2$/g. Catalytic activity was found to be 78%.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

The invention claimed is:

1. A method for in-situ formation of metal surface modified mixed oxide material, comprising:
  burning a titanium chloride comprising compound and a silicon chloride comprising compound in the presence of oxygen and hydrogen in a reactor to form a plurality of silica-titania mixed oxide particles, wherein a temperature during said burning step is from 700 to 1100° C., and,
  while said mixed oxide particles are in said reactor, depositing a metal on a surface of said mixed oxide particles at a temperature below said temperature of said burning step.

2. The method of claim 1, wherein silica and titania each comprise at least 30 wt. % of said mixed oxide particles.

3. The method of claim 1, further comprising the step of removing adsorbed chlorine from said surface with steam at a steaming temperature $\leqq 220°$ C.

4. The method of claim 3, wherein said steaming temperature is between 170 and 200° C.

5. The method of claim 1, wherein said depositing step comprises cooling said mixed oxide particles while in said reactor to a temperature between 300 and 700° C. in an atmosphere comprising at least one metal source and a reducing agent.

6. The method of claim 5, wherein said depositing comprises injecting an aerosol comprising said metal into a heat exchanger within said reactor.

7. The method of claim 1, wherein a concentration of said hydrogen is in a stoichiometric excess ($H_2:O_2$) to said oxygen from 2.02:1 to 2.61:1 during said burning.

8. The method of claim 1, wherein said titanium chloride comprising compound comprises titanium tetrachloride and said silicon chloride comprising compound comprises silicon tetrachloride.

9. The method of claim 1, wherein said metal comprises at least one of Pd, Co, Ni, Fe, Pt, Zn, W, Bi and Mo.

10. The method of claim 1, wherein a source for said metal is supplied to said reactor during said burning step, further wherein a bulk of said mixed oxide particles includes said metal.

11. A metal surface modified mixed oxide composition, comprising:
  a plurality of nanosize silica-titania mixed oxide particles, wherein said titania comprises non-stoichiometric $TiO_{2-x}$, further wherein $0.1 < x < 0.3$ at a surface of said particles and in the bulk of said particles said x is less than at said surface, and
  at least one metal on a portion of a surface of said mixed oxide particles.

12. The composition of claim 11, wherein said metal comprises a plurality of nanoparticles of said metal.

13. The composition of claim 12, wherein said nanoparticles comprise at least one of Pd, Co, Ni, Fe, Pt, Zn, W, Bi and Mo.

14. The composition of claim 11, wherein a magnetic susceptibility ($\chi$) of said mixed oxide composition is between $0.4 \times 10^{-6}$ cm$^3$/g and $1.8 \times 10^{-6}$ cm$^3$/g at 300 K.

15. The composition of claim 11, wherein said particles are agglomerated particles, wherein an average size of said agglomerated particles is from 10 to 50 nm.

16. The composition of claim 11, wherein a bulk of said mixed oxide particles includes said metal.

17. A metal surface modified mixed oxide composition, comprising:
  a plurality of nanosize silica-titania mixed oxide particles, wherein a portion of a surface of said mixed oxide particles include a least one metal, said mixed oxide composition formed from a process comprising:
  burning a titanium chloride comprising compound and a silicon chloride comprising compound in the presence of oxygen and hydrogen in a reactor to form said plurality of silica-titania mixed oxide particles, wherein a temperature during said burning step is from 700 to 1100° C. and a concentration of said hydrogen is in a stoichiometric excess to said oxygen ($H_2:O_2$) from 2.02:1 to 2.61:1 during said burning step, and
  depositing metal on a surface of said mixed oxide particles while in said reactor at a temperature below said temperature of said burning step.

18. The composition of claim 17, wherein a source for said metal is supplied to said reactor during said burning step, further wherein a bulk of said mixed oxide particles includes said metal.

19. The composition of claim 17, wherein said titania comprises non-stoichiometric $TiO_{2-x}$, further wherein $0.1 < x < 0.3$ at a surface of said particles and in the bulk of said particles said x is less than at said surface.

20. The composition of claim 17, wherein said metal comprises a plurality of nanoparticles of said metal.

* * * * *